United States Patent Office 3,475,357
Patented Oct. 28, 1969

3,475,357
METHOD OF PREPARING REGENERATED CELLULOSE-STYRENE GRAFT COPOLYMER
Joseph M. Kuzmak, Riddlewood, Media, Pa., assignor to FMC Corporation, Philadelphia, Pa., a corporation of Delaware
No Drawing. Filed July 5, 1967, Ser. No. 651,144
Int. Cl. C08b *15/00*
U.S. Cl. 260—17.4          10 Claims

ABSTRACT OF THE DISCLOSURE

A process of grafting styrene polymers and copolymers onto regenerated cellulose is disclosed herein.

---

It is an object of this invention to provide a commercially feasible and effective method of obtaining high "add-on" graft copolymers with regenerated cellulose as the base or "backbone" polymer and styrene or styrene and a copolymerizable monomer as the material which forms the grafted-on polymer chain.

To meet this and other objects, this invention comprises graft polymerizing styrene alone or in combination with at least one other copolymerizable monomer with regenreated cellulose in the presence of a catalyst consisting of a peroxidic free-radical producing initiator, said regenerated cellulose having been prepared by regeneration thereof from viscose in the presence of a regeneration retarding agent.

In the past, successful grafting system, such as the ceric ion method, utilized acrylonitrile and other acrylic monomers much more readily for the preparation of graft copolymers than styrene. With the method of this invention, it has been found unexpectedly that styrene grafts very readily to the regenerated cellulose with substantially no homopolymer formation, while other monomers provide little or no grafting within a reasonable reaction time. Furthermore, previously it had been found necessary to add a reducing cation, such as the ferrous ion, to the catalyst system for producing graft copolymers within a reasonable reaction time. In the present invention, it has been found that grafting takes place very readily without the addition of a reducing cation material.

In its preferred form, this invention is concerned with the grafting of styrene monomer and comonomers to regenerated cellulose fibers, and more preferably with fibers which have been stretched to provide a fiber of high strength or high crimp. Regenerated cellulose fibers of this type are generally produced by extruding viscose filaments into an acid bath containing a zinc compound, preferably zinc sulfate, to modify the fine structure of the regenerated filament, as is well-known. The coagulated and partially regenerated fiber, is stretched and then completely regenerated.

In accordance with this invention, the regenerated cellulose must be prepared in the presence of a regeneration retardant. The retardant is either incorporated in the viscose or in the spinning bath. Regeneration retardants for viscose are well-known and include for example, aliphatic monoamines, e.g., dimethyl amine, diethyl amine, dipropyl amine, diethyl aminoethanol, butyl amine, triethanol amine, cyclohexylamine, ethyl diethanol amine, dipropanol amine, hexanolamine, hexamethyleneimine, piperidine, pyridine, and hexyldiethanol amine; aliphatic diamines, e.g., ethylene diamine, trimethylene diamine, tetramethylene diamine, N-methyl-trimethylene diamine, N,N'-dimethylene diamine, piperazine, hexamethylene diamine, 1,4-cyclohexane diamine and 3-dimethylamino-hexamethylene diamine; ethers and ether-alcohols, e.g., ethoxyethanol, butoxyethanol, phenoxyethanol, methoxyethanol, methoxyethoxyethanol, butoxyethoxyethanol, phenoxyethoxyethanol, diethyl glycol ether, and diethylene glycol diethyl ether; polyethylene glycols of varying molecular weights up to 2500; quaternary ammonium compounds, e.g., benzyl trimethyl ammonium hydroxide and tetraethylammonium hydroxide; salts of N-substituted dithiocarbamic acids, e.g., sodium amyl dithiocarbamate and sodium butyl monoethanol dithiocarbamate; alkylene oxide modified phenol and substituted phenol wherein the alkylene oxide units range from 3 to 300 and higher; dialkyl amides, e.g., dimethyl formamide, diethyl formamide, and dimethyl acetamide; and the like, alone or in mixtures.

The aliphatic mono-amines, particularly dimethyl amine, are the preferred retardants for this invention on the basis of performance with respect to higher "add-ons" of the grafted polymer.

The amount of the regeneration retardant will vary somewhat with the particular compound used, but in general, the amount ranges from about 0.05 to about 10%, preferably from about 1.0% to about 5%, based on the weight of the cellulose. When the retardant is incorporated in the spinning bath, amounts which produce equivalent results are used.

Regenerated cellulose which has not been prepared in the presence of a regeneration retardant is not particularly useful in the grafting process of this invention as little or no graft polymer will attach to the cellulose base. Likewise, cotton is not useful for this process, since no grafting is achieved when it is used as the backbone polymer. This was true even when cotton had been impregnated with either the regeneration retardant dimethylamine or the dimethyldithiocarbamic acid dimethyl ammonium salt under acid and basic conditions. The exact mechanism of the reaction of this invention is not known at this time and may be associated with the chemical or physical effect of the regeneration retardant. In any case, its presence has been found to be necessary.

The peroxidic free-radical initiators for the grafting process of this invention are well-known and include, for example, hydrogen peroxide, alkali metal and ammonium persulfates, t-butyl hydroperoxide, cumene hydroperoxide, phenylethyl hydroperoxide, di-t-butyl peroxide, dicumyl peroxide, benzoyl peroxide, acetyl peroxide, t-butyl peroxyacetate, peracetic acid and the like. The preferred initiators are water-soluble, such as hydrogen peroxide.

The graft polymerization reaction is generally carried out in an aqueous medium in which the initiator is present in an amount of at least about 0.01%, preferably from about 0.1 to about 1.0%, based on the weight of the aqueous medium. It has been found that the higher the initiator concentration, the greater the amount of grafting under given reaction conditions.

As previously stated, the essential monomer which must be present to provide satisfactory grafting in the process of this invention is styrene. Ethylenically unsaturated monomers may be copolymerized with styrene in the graft copolymer. These comonomers include, for example, acrylonitrile, methacrylonitrile, esters of acrylic or methacrylic acid and alkanols having from 1 to 20 carbon atoms; acrylamides, vinyl acetate, vinyl propionate, vinyl butyrate, vinyl phthalate, allyl acrylate, allyl methacrylate, allyl benzoate, diallyl phthalate, vinyl chloride, vinylethyl ether, divinyl sulfone, butadiene, isoprene, choroprene, alpha-olefins, itaconic acid, and the like.

The styrene monomer or combination styrene-ethylenically unsaturated comonomer are generally present in the aqueous graft polymerization medium in an amount of at least about 0.02%, preferably from about 1.0% to about 10.0%, based on the weight of the aqueous medium.

The pH of the polymerization medium should not be more than 7 to obtain good grafting, since the "add-on" falls off rapidly under alkaline conditions, however, within the acid to neutral range, the pH is not critical and may be adjusted and/or buffered if desired.

The amount of grafting or "add-on" is dependent to some degree on the time and temperature of the polymerization reaction. The reaction should be carried out for at least about 5 minutes, preferably at least 30 minutes. Less time is necessary at higher temperatures for higher polymer "add-on." Reactions may be carried out for at least an hour or more, if desired.

The temperature for the reaction should be at least room temperature or 25° C., although some reaction will occur at lower temperatures if carried out over prolonged periods. In general, temperatures between 25° and 100° C. are used at atmospheric pressure, but preferably between 40° and 80° C.

The reaction may be carried out at atmospheric pressure, superatmospheric pressure or under vacuum. Atmospheric pressure is preferred for non-vaporous monomers in a commercial adaptation of the process.

The polymerization reaction is generally carried out in the presence of air, but may also take place in the absence of oxygen, for example, by purging the cellulose and/or the reaction vessel or area with nitrogen.

As previously stated, the preferred regenerated cellulose for this invention is in the form of fibers, particularly textile fibers, however, the regenerated cellulose article may have any shape including monofilament, multifilament yarn, staple yarn, cord, woven or non-woven sheets, films, bands, sponges and the like.

The cellulose xanthate in viscose solutions is generally coagulated and at least partially regenerated in an acid bath, for example, an aqueous bath containing sodium sulfate and sulfuric acid. The article may be completely regenerated in one bath or a series of baths. Zinc salt is preferably used in the bath or baths for the manufacture of textile fibers.

The coagulated and at least partially regenerated fiber may be stretched in one or more operations from as little as 5% to as much as 200% or more, depending on processing conditions and the desired result. For the preparation of staple fiber, for example, the stretched fiber may be allowed to shrink in a plasticizing medium, such as hot water, to obtain crimp.

The following examples are set forth to demonstrate this invention.

Example I

High tenacity rayon yarn was prepared by spinning a viscose containing about 2%, based on the weight of the viscose, of dimethylamine, into an aqueous acid spinning bath containing sulfuric acid, zinc sulfate and sodium sulfate. The gel-yarn was given a high stretch and then passed through another aqueous bath containing sulfuric acid, zinc sulfate and sodium sulfate to complete the regeneration. The yarn was then wet processed and dried.

Portions of the yarn were placed in aqueous baths containing ethylenically unsaturated monomer and 0.25% hydrogen peroxide for one hour. The bath temperatures were maintained at 45° C. with a pH of 5-6. The results of these procedures, using various monomers, with respect to the degree of grafting to the regenerated cellulose are reported as "add-on" in the following table.

TABLE I

| Monomer: | Percent add-on |
|---|---|
| 4% styrene | 40 |
| 4% vinyl acetate | 0 |
| 4% butyl acrylate | 0 |
| 4% acrylonitrile | 0 |
| 4% methyl methacrylate | 0 |
| 2% styrene and 2% methyl methacrylate | 83 |
| 2% styrene and 2% acrylonitrile | 80 |

The above data show that styrene grafts very readily to the regenerated cellulose in the method of this invention while other monomers, which graft very readily with other grafting systems, do not, surprisingly, the presence of styrene with comonomers leads to an even higher degree of grafting. No homopolymer was formed during the grafting procedures.

Example II

Regenerated cellulose yarn samples, as prepared in Example I, were placed in aqueous baths as described for Example I for one hour. Monomers in the bath were combinations of styrene and butyl acrylate. The results of these procedures are given in the following table.

TABLE II

| Monomer: | Percent add-on |
|---|---|
| 0.0% styrene and 3.0% butyl acrylate | 0 |
| 0.05% styrene and 3.0% butyl acrylate | 20 |
| 0.1% styrene and 3.0% butyl acrylate | 17-20 |
| 0.5% styrene and 3.0% butyl acrylate | 22 |

While the monomer, butyl acrylate, by itself cannot be grafted onto regenerated cellulose with this method, the above data show that only a small amount of styrene need be present to promote a grafting reaction.

When the time was extended for the above reaction conditions using 0.1% styrene, the following results were obtained.

TABLE III

| Reaction time (hrs.): | Percent add-on |
|---|---|
| 1 | 17-20 |
| 1½ | 34 |
| 2 | 43 |
| 3 | 49 |
| 5 | 73 |

Infra-red examination of these fibers indicates that the grafted polymer is almost completely butyl acrylate.

Example III

The necessity of using a regeneration retardant was demonstrated by the following procedure.

Various regenerated cellulose fibers were used in graft polymerization reactions under the same conditions, except for the fiber itself. The aqueous reaction baths contained a combination of 2% styrene and 2% methyl methacrylate, and 0.25% hydrogen oxide. They were maintained at 45° C. with a pH of 5-6, during the reaction.

The regenerated cellulose fibers were prepared by spinning a viscose solution into an aqueous acid spinning bath containing sulfuric acid, zinc sulfate and sodium sulfate. While the spinning and stretching conditions varied somewhat from fiber to fiber, the critical difference was in the absence or presence of a regeneration retardant during the spinning (viscose additive).

The results of these reaction procedures are given in the following table.

TABLE IV

| Fiber | Percent Add-On | Viscose additive |
|---|---|---|
| High tenacity regenerated cellulose | 80 | 2% dimethyl amine. |
| High wet modulous regenerated cellulose | 100 | 1.75% dimethyl amine and 3.0% alkyleneoxide modified phenol.[1] |
| Conventional regenerated cellulose | 4 | None. |
| Cotton | 0 | Do. |

[1] Polyalkylene oxide substituted phenol containing about 15 alkylene oxide units per molecule.

From the above, it is evident that a regeneration retardant is necessary to produce the excellent grafting results of this invention. Thus, the retardant serves two purposes in permitting the formation of higher strength products and in providing a workable cellulose base polymer for the grafting process of this invention.

In the process of this invention, exposure during the reaction to ultra-violet irradiation does not influence the amount of grafting.

Examination of the graft copolymer fibers prepared in accordance with this invention under a microscope showed the cross-sections of the fibers to be remarkably uniform, indicating a very uniform graft add-on.

Various changes and modifications may be made practicing this invention without departing from the spirit and scope thereof, and therefore, the invention is not to be limited except as defined in the appended claims.

I claim:

1. A method of preparing graft copolymers of regenerated cellulose which comprises reacting regenerated cellulose with styrene monomer or styrene monomer and at least one other ethylenically unsaturated monomer copolymerizable therewith in the presence of a catalyst consisting of a peroxidic free-radical producing initiator, said regenerated cellulose having been prepared by regeneration thereof from viscose in the presence of an aliphatic amine regeneration retarding agent.

2. The method of claim 1 wherein the regeneration retarding agent includes an aliphatic mono-amine.

3. The method of claim 2 wherein the aliphatic mono-amine is dimethyl amine.

4. The method of claim 1 wherein regenerated cellulose is reacted with a combination of styrene and acrylonitrile monomers.

5. The method of claim 1 wherein regenerated cellulose is reacted with a combination of styrene and an alkyl methacrylate monomer, and the alkyl group has from 1 to 20 carbon atoms.

6. The method of claim 1 wherein regenerated cellulose is reacted with a combination of styrene and an alkyl acrylate monomer wherein the alkyl group has from 1 to 20 carbon atoms.

7. The method of claim 1 wherein the regenerated cellulose is in the form of a fiber prepared by the regeneration of a plurality of viscose filaments in a zinc salt-containing acid bath.

8. The method of claim 7 wherein the regeneration retarding agent includes an aliphatic mono-amine.

9. The method of claim 8 wherein the aliphatic mono-amine is dimethyl amine.

10. The method of claim 1 wherein the peroxidic initiator is hydrogen peroxide.

References Cited
UNITED STATES PATENTS

| | | |
|---|---|---|
| 3,083,118 | 3/1963 | Bridgeford. |
| 3,194,727 | 7/1965 | Adams et al. |
| 3,357,933 | 12/1967 | Faessinger et al. |

WILLIAM H. SHORT, Primary Examiner

E. NIELSEN, Assistant Examiner

U.S. Cl. X.R.

8—116; 264—195

UNITED STATES PATENT OFFICE
CERTIFICATE OF CORRECTION

Patent No. 3,475,357                                October 28, 1969

Joseph M. Kuzmak

It is certified that error appears in the above identified patent and that said Letters Patent are hereby corrected as shown below:

Column 1, line 26, "regenreated" should read -- regenerated --. Column 2, line 66, "choroprene" should read -- chloroprene --. Column 4, line 4, "do not, surprisingly," should read -- do not. Surprisingly, --; line 46, "oxide" should read -- peroxide --.

Signed and sealed this 3rd day of March 1970.

(SEAL)
Attest:

Edward M. Fletcher, Jr.                          WILLIAM E. SCHUYLER, JR.
Attesting Officer                                       Commissioner of Patents